P. BEVENOT & E. DE NEVEU.
DESICCATING PROCESS.
APPLICATION FILED MAY 10, 1906.

1,020,632.

Patented Mar. 19, 1912.
2 SHEETS—SHEET 1.

WITNESSES

INVENTORS
Paul Bevenot
Edward de Neveu
BY
ATTORNEYS

P. BEVENOT & E. DE NEVEU.
DESICCATING PROCESS.
APPLICATION FILED MAY 10, 1906.

1,020,632.

Patented Mar. 19, 1912.

2 SHEETS—SHEET 2.

Witnesses
Jos. S. Latimer
Frank A. Peters.

Inventor
Paul Bévenot
Edward de Neveu
by Arthur S. Brown
Associate Attorney

UNITED STATES PATENT OFFICE.

PAUL BÉVENOT, OF PARIS, AND EDWARD DE NEVEU, OF ASNIERES, FRANCE.

DESICCATING PROCESS.

1,020,632.  Specification of Letters Patent.  Patented Mar. 19, 1912.

Application filed May 10, 1906. Serial No. 316,115.

*To all whom it may concern:*

Be it known that we, PAUL BÉVENOT, a citizen of the Republic of France, and residing at 7 Rue Lafitte, Paris, France, and EDWARD DE NEVEU, a citizen of the United States of America, and residing temporarily at 42 Avenue Chevreul, Asnières, Seine, France, have invented a new and Improved Desiccating Process, of which the following is a full, clear, and exact description.

This invention relates to the desiccating of liquid products, and is intended to be especially useful for the purpose of desiccating milk. By its means milk may be dried and preserved in such a way that it may be brought again to a liquid state simply by the addition of cold water.

The invention consists in the process and apparatus to be described more fully hereinafter and particularly set forth in the claims.

Reference is to be had to the accompanying drawings forming a part of this specification, in which similar characters of reference indicate corresponding parts in all the views.

Figure 1:
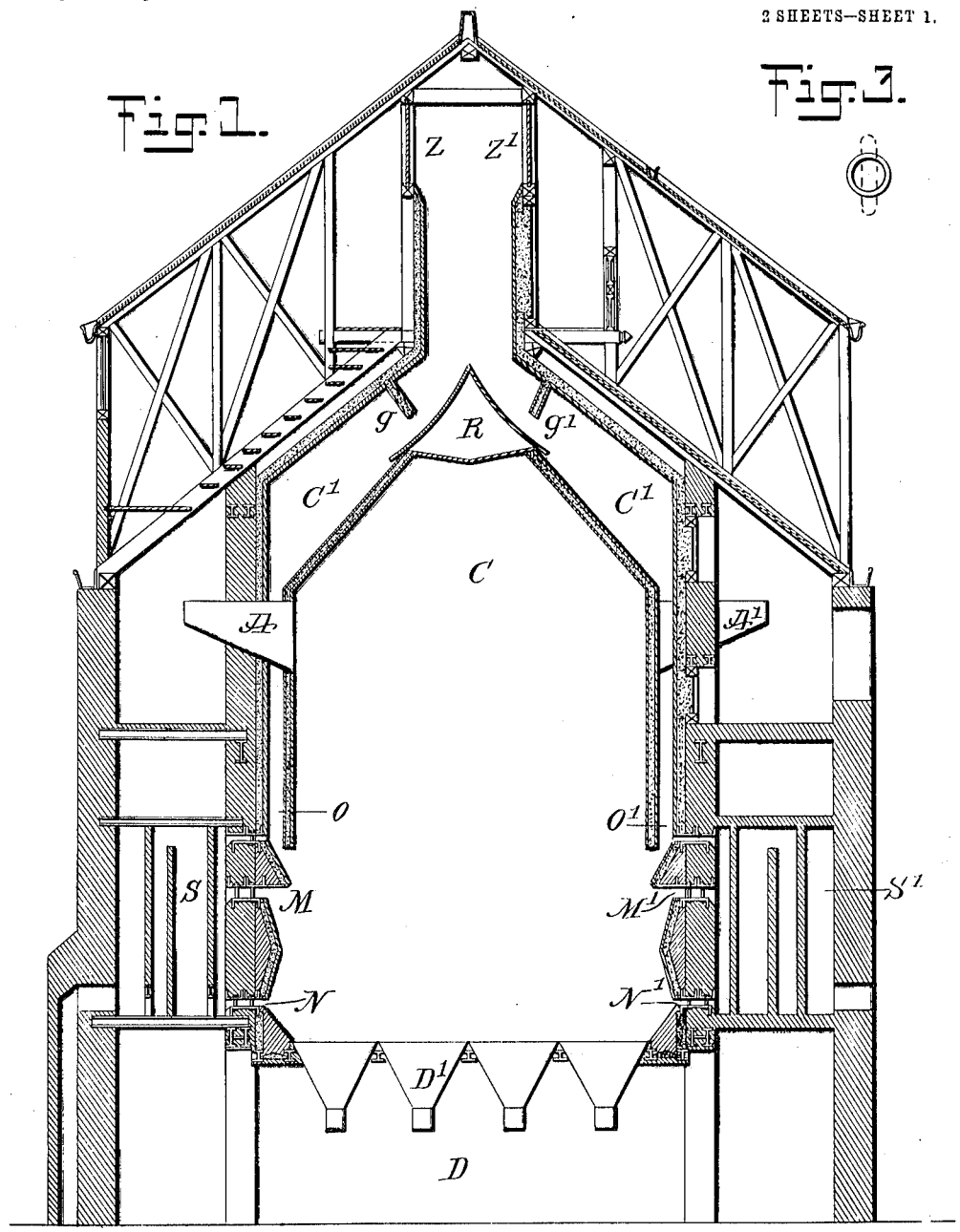
Figure 3:
Figure 2:
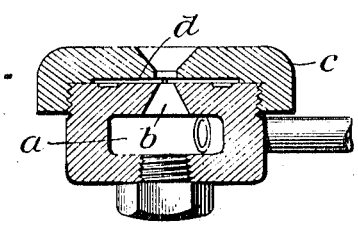
Figure 4:
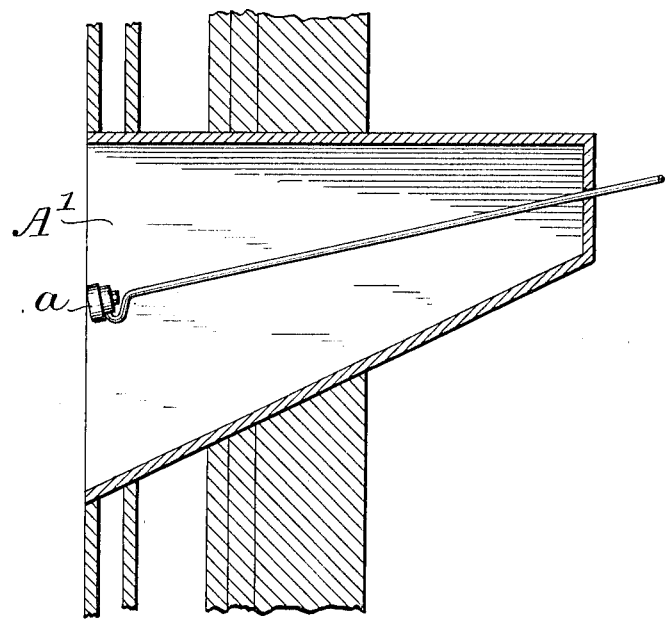
Figure 5:
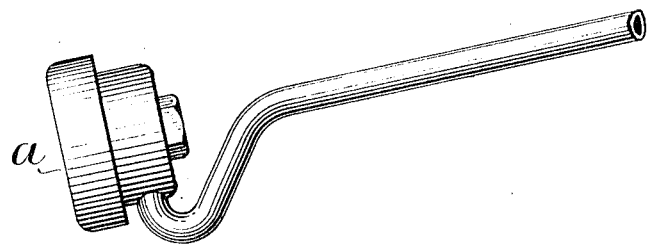

Figure 1 is a vertical section through a stove or apparatus by means of which we practice our invention; Fig. 2 is a cross section through one of the nozzles through which the milk is forced; and Fig. 3 is a detail view of a part of the nozzle shown in Fig. 2. Fig. 4 is a detail section of one of the nozzle cones. Fig. 5 is a side view of one of the nozzles.

The drawing represents apparatus by means of which our process may be carried out. This apparatus comprises a large chamber C, C' divided by partitions longitudinally into a pulverizing chamber C and an expansion chamber C', to be described more fully hereinafter. Into the pulverizing chamber C the milk is conducted and projected laterally by means of a compressor, not shown, so that the milk is directed through the pulverizer in such a way that it is transformed without the addition of air, into a mist within the said pulverizing chamber. In this chamber C is effected the drying of the milk in a progressive manner from above downwardly, by the hot air which arrives through the longitudinal orifices M and N and M', N'. The expansion chamber C' is arranged above the pulverizing chamber; in this chamber the milk, not entirely dried, which has been drawn upwardly, deposits, by reason of the diminution of its velocity within a larger surface. The solid particles of the milk are drawn up around the regulator or damper R by the current of hot moist air which escapes around this damper. $g$, $g'$ are obstructions or baffles. These particles so obstructed, in falling in this chamber C', are brought into contact with the ascending current of warm air arriving through the vertical passages O, O', and this current dries the particles in such a manner that they slip down said passages and encounter a lower current of hot air admitted at N, N', which effects a complete drying of the same. The moist air continues its ascending movement and escapes at Z, Z' outside into the atmosphere.

We provide two heating chambers S, S' along the sides of the drying chamber C, in which the air is heated by means of a series of radiator pipes, not shown, through which steam circulates; also, two longitudinally disposed chambers disposed above the heating chambers and through which pass the conduits, not shown, carrying the milk from the pumps, not shown, to the pulverizers, and branches, not shown, are provided leading from these conduits into the cones A, A, A and A', A', A'; also, a receiving chamber D where the dried material is collected in the state of powder by means of receptacles such as hoppers D', illustrated, placed under the chambers C, C'. The inner surfaces of the drying chambers are constructed so that they may be readily cleaned and even washed, by means of a forced current of air and water, introduced through openings or in any other suitable manner. All the surfaces are covered with a non-conducting substance, with great care, so as to prevent loss of heat through the said surfaces.

The milk at a pressure of from 150 to 200 atmospheres at the extremity of a conducting tube, enters tangentially into the body of a nozzle $a$; this body is cylindrical and has an interior height substantially equal to the height of the incoming tube, as shown in Fig. 3. The bottom or lower head of this nozzle is closed by a removable screw, to enable its interior to be readily cleaned. The upper head of the nozzle terminates in a centrally disposed conical opening $b$ over which screws a cap $c$. A space is left, as indicated, between the cap and the body of the nozzle, in which there is placed a ring of leather or similar material, to form a tight joint, the said ring pressing against a thin disk *d* of steel, nickel-steel, or similar material. In the center of this disk there is formed a very small opening from 3/10 to 1/10 of a millimeter in diameter, according to the density of the mixture of milk or the milk itself which is to be desiccated. Instead of steel or nickel-steel, a perforated stone such as a ruby or a sapphire, may be used for replacing the disk. The cap *c* may be constructed of substantial dimensions so as to resist the pressure, and the threads for connecting the same may be several in number to insure that a tight joint will result.

The liquid is projected into the interior of the nozzle in a tangential manner, and is turned by the curvature of the wall, in a circular path within the interior of the nozzle, with a high velocity. It escapes by the central orifice, and by reason of the fact that the thickness of the disk is very small, the orifice through which the milk escapes does not have the effect of guiding the liquid as it passes through, so that a rotary or whirling motion is imparted to the ejected spray or mist. In this way the milk is dissipated in all directions as it passes under the nozzle, the dissipation being largely due, of course, to the centrifugal force developed in the particles of the liquid by its high velocity developed in a circular path within the nozzle. In this way the milk is thrown into a very finely divided condition in such a way as to produce a mist and not merely a fine spray.

The mode of operation of the apparatus will now be described.

The liquid under suitable pressure, generally from 150 to 200 atmospheres, depending upon the density of the milk, is driven by the compressor through a series of nozzles or spraying apparatus placed in the cones A, A, A and A', A', A', arranged in the most favorable manner, to cause the liquid to be directed from above downwardly as indicated in Fig. 4. This pressure is communicated directly to the liquid; that is to say, without the admixture of any air. The arrangement is such that the liquid can only arrive within the drying chamber in the state of fog or mist. It is then subjected successively to the action of hot air which enters from the heating chambers through the orifices M, M', N, N'. The dried extracts of the liquid have a temperature which depends upon the material being treated, and varies from 60 to 99 degrees centigrade; that is to say, under 100 degrees, and in the case of milk it is in the neighborhood of 65 to 75° C. This dry extract falls upon the bottom of the receiving chamber by reason of the fact that the force of the ascending current of air is not sufficient to maintain it in suspension, the descent of the milk being promoted by its partially dried condition. In this connection, it should be understood that the flow of the liquid and the current of air may be regulated so that at this point a substantially constant temperature may be maintained. The hot air from the orifices M, M' and passages O, O' begins the drying of the liquid, and this is finished by the warm air arriving through the orifices N, N'.

By means of the apparatus described above, the milk solids in the form of powder may be obtained, the said powder containing all the elements of the milk. No coagulation of the caseins or change in the sugar of the milk takes place, nor are the fatty matters of the milk changed in any manner. No precipitation of the salts, such as phosphates, takes place when the powder is again made liquid by the addition of water. The users of this apparatus can, in other words, preserve all the qualities of the milk elements as they were originally in fresh milk; that is to say, a powder can be obtained of extremely fine odor and taste which is in an extremely fine state of subdivision and perfectly soluble in cold water. When dissolved in this way, the resulting mixture has all the qualities of fresh milk. This result is accomplished entirely without the agency of chemicals of any kind whatever, so that consumers of the milk will not be subjected to any risk by drinking the milk, and the process conforms strictly with the pure food laws of all countries.

What we claim as our invention is:

1. The process of desiccating liquids containing organic elements which consists in subjecting the liquid to high pressure, in ejecting the liquid at high velocity by such pressure through a minute orifice in the form of a finely divided mist and into a current of heated air, and in imparting to the ejected mist a rotary motion.

2. The process of desiccating liquids containing organic elements which consists in subjecting the liquid to high pressure, and in ejecting the liquid at high velocity by such pressure through a minute orifice in the form of a finely divided mist and into a current of heated air.

3. The process of desiccating liquids containing organic elements which consists in subjecting the liquid to a pressure in the neighborhood of one hundred and fifty atmospheres, in ejecting the liquid by such pressure in the form of a finely divided mist through a minute orifice a fraction of a millimeter in diameter and into a current of heated air, and in imparting to the ejected mist a rotary motion.

4. The process of desiccating liquids containing organic elements which consists in subjecting the liquid to a pressure in the neighborhood of one hundred and fifty atmospheres, and in ejecting the liquid by such pressure in the form of a finely divided mist through a minute orifice a fraction of a millimeter in diameter and into a current of heated air.

5. The process of desiccating organic liquids, such as milk, which consists in spraying the liquid into a current of moisture-absorbing dry air, and in imparting to the sprayed liquid a whirling motion.

6. The process of desiccating liquids containing organic elements which consists in forcing the liquid alone under great pressure tangentially into a chamber to produce centrifugal action by rotation and permitting the liquid to escape centrally in a capillary stream, whereby it is scattered widely, in the form of a rotary mist and in subjecting such scattered stream to a current of heated air.

In testimony whereof we have signed our names to this specification in the presence of two subscribing witnesses.

PAUL BÉVENOT.
EDWARD DE NEVEU.

Witnesses:
AUGUSTUS E. INGRAM,
HANSON C. COXE.